(12) United States Patent
Yoshida et al.

(10) Patent No.: US 11,336,436 B2
(45) Date of Patent: May 17, 2022

(54) KEY DISTRIBUTION SYSTEM AND METHOD, KEY GENERATION APPARATUS, REPRESENTATIVE USER TERMINAL, SERVER APPARATUS, USER TERMINAL, AND PROGRAM

(71) Applicant: NIPPON TELEGRAPH AND TELEPHONE CORPORATION, Chiyoda-ku (JP)

(72) Inventors: Reo Yoshida, Musashino (JP); Tetsutaro Kobayashi, Musashino (JP); Yuto Kawahara, Musashino (JP); Hitoshi Fuji, Musashino (JP); Kazuki Yoneyama, Hitachi (JP)

(73) Assignee: NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 95 days.

(21) Appl. No.: 16/607,004

(22) PCT Filed: Apr. 27, 2018

(86) PCT No.: PCT/JP2018/017124
§ 371 (c)(1),
(2) Date: Oct. 21, 2019

(87) PCT Pub. No.: WO2018/207653
PCT Pub. Date: Nov. 15, 2018

(65) Prior Publication Data
US 2020/0136813 A1 Apr. 30, 2020

(30) Foreign Application Priority Data
May 9, 2017 (JP) .............................. JP2017-092760

(51) Int. Cl.
*H04L 29/06* (2006.01)
*H04L 9/08* (2006.01)

(52) U.S. Cl.
CPC ............ *H04L 9/083* (2013.01); *H04L 9/0861* (2013.01)

(58) Field of Classification Search
CPC ........................... H04L 9/083; H04L 67/1046
See application file for complete search history.

(56) References Cited

U.S. PATENT DOCUMENTS

2005/0138353 A1* 6/2005 Spies .................. H04L 63/0442
713/153
2010/0098253 A1* 4/2010 Delerablee ............ H04L 9/0833
380/259

(Continued)

FOREIGN PATENT DOCUMENTS

JP 2003-318875 A 11/2003

OTHER PUBLICATIONS

Zhang et al., "Provably Secure Certificateless Authenticated Asymmetric Group Key Agreement", International Conference on Information Security Practice and Experience, May 2014, pp. 496-510 (Year: 2014).*

(Continued)

*Primary Examiner* — Thaddeus J Plecha
(74) *Attorney, Agent, or Firm* — Oblon, McClelland, Maier & Neustadt, L.L.P.

(57) ABSTRACT

A key distribution system includes a representative user terminal $2_p$, a server apparatus 3, and an (n+1)-th user terminal $2_{n+1}$. The representative user terminal $2_p$ uses a public key for the (n+1)-th user terminal $2_{n+1}$ and information for identifying the (n+1)-th user terminal $2_{n+1}$ to encrypt key information with a predetermined encryption function in Certificate-less Encryption to obtain ciphertext. The server (Continued)

apparatus 3 sends the ciphertext to the (n+1)-th user terminal $2_{n+1}$ when the (n+1)-th user terminal $2_{n+1}$ is added. The (n+1)-th user terminal $2_{n+1}$ uses a complete secret key for the (n+1)-th user terminal $2_{n+1}$ and the information for identifying the (n+1)-th user terminal $2_{n+1}$ to decrypt the ciphertext with a predetermined decryption function to obtain the key information.

2 Claims, 2 Drawing Sheets

(56) References Cited

U.S. PATENT DOCUMENTS

| | | | |
|---|---|---|---|
| 2011/0055567 | A1 | 3/2011 | Sundaram et al. |
| 2013/0212377 | A1* | 8/2013 | Malek ................. H04L 9/0825 713/155 |
| 2016/0269185 | A1* | 9/2016 | Stojanovski ............ H04L 9/083 |
| 2016/0323100 | A1* | 11/2016 | Tsai ...................... H04L 9/0861 |
| 2021/0409212 | A1* | 12/2021 | Nakaide ................ H04L 9/0894 |

OTHER PUBLICATIONS

Barbosa et al., "Certificateless Signcryption", Mar. 2008, pp. 369-372 (Year: 2008).*
Zhang et a., "Certificateless Public-Key Signature: Security Model and Efficient Construction", Jun. 2006, pp. 293-308 (Year: 2006).*
Japanese Office Action dated Apr. 7, 2020 in Patent Application No. 2019-517565 (with English translation), 9 pages.
International Search Report dated Aug. 7, 2018 in PCT/JP2018/017124 filed on Apr. 27, 2018.
Kobayashi, T. et al., "ID-based Scalable and Dynamic Multi-Cast Key Distribution for secure business chat system," SCIS 2017, Jan. 24-27, 2017, pp. 1-8 (total 11 pages).
Dent, A. W. et al., "Certificateless Encryption Schemes Strongly Secure in the Standard Model," Cryptology ePrint Archive, Dec. 3, 2007, pp. 1-34.
Yoshida, R. et al., ID-based Dynamic Multi-key Distribution Protocol with Non-interactive Join and its Performance Evaluation, SCIS 2018, Jan. 23-26, 2018, pp. 1-8.
Yoneyama, K. et al., "Multi-cast Key Distribution: Scalable, Dynamic and Provably Secure Construction," International Conference on Provable Security ProvSec 2016: Provable Security, Oct. 13, 2016, pp. 207-226.

* cited by examiner

KEY DISTRIBUTION SYSTEM AND METHOD, KEY GENERATION APPARATUS, REPRESENTATIVE USER TERMINAL, SERVER APPARATUS, USER TERMINAL, AND PROGRAM

TECHNICAL FIELD

The present invention relates to an information security technology.

BACKGROUND ART

Applications such as voice over Internet protocol (VoIP), web real-time communication (WebRTC), and messaging are provided through the Internet, and therefore, it has become important to ensure confidentiality in communication and systems on the basis of authentication.

Since many users use services through such applications on the Internet, it is important to make communication and systems available to many persons. Transport layer security (TLS) is generally used for this purpose.

Conventionally, it has been proposed that keys used in these services be distributed by using, for example, the technology described in Non-Patent Literature 1 (see Non-Patent Literature 1, for example).

PRIOR ART LITERATURE

Non-Patent Literature

Non-Patent Literature 1: Kazuki Yoneyama, Reo Yoshida, Yuto Kawahara, Tetsutaro Kobayashi, Hitoshi Fuji, Tomohide Yamamoto, "Multi-cast Key Distribution: Scalable, Dynamic and Provably Secure Construction", International Conference on Provable Security ProvSec 2016: Provable Security, pp. 207-226

SUMMARY OF THE INVENTION

Problems to be Solved by the Invention

In the technology described in Non-Patent Literature 1, when a key is distributed to a user terminal to be newly added in a join phase, it is necessary to perform computation between the server apparatus and not only the user terminal to be newly added but also the user terminals that have already joined the session.

An object of the present invention is to provide a key distribution system and method, a representative user terminal, a server apparatus, a user terminal, and a program that make it unnecessary to perform computation between the server apparatus and the user terminals that have already joined the session in the join phase.

Means to Solve the Problems

A key distribution system according to an embodiment of the present invention includes a representative user terminal, a server apparatus, and an (n+1)-th user terminal. The representative user terminal uses a public key for the (n+1)-th user terminal and information for identifying the (n+1)-th user terminal in Certificate-less Encryption to encrypt key information with a predetermined encryption function in Certificate-less Encryption to obtain ciphertext and sends the obtained ciphertext to the server apparatus. The server apparatus sends the ciphertext to the (n+1)-th user terminal when the (n+1)-th user terminal is added. The (n+1)-th user terminal uses a complete secret key for the (n+1)-th user terminal and the information for identifying the (n+1)-th user terminal in Certificate-less Encryption to decrypt the ciphertext with a predetermined decryption function in Certificate-less Encryption to obtain the key information.

Effects of the Invention

In the join phase, computation between the server apparatus and the user terminals that have already joined the session is made unnecessary.

DETAILED DESCRIPTION OF THE EMBODIMENTS

Figure 1:
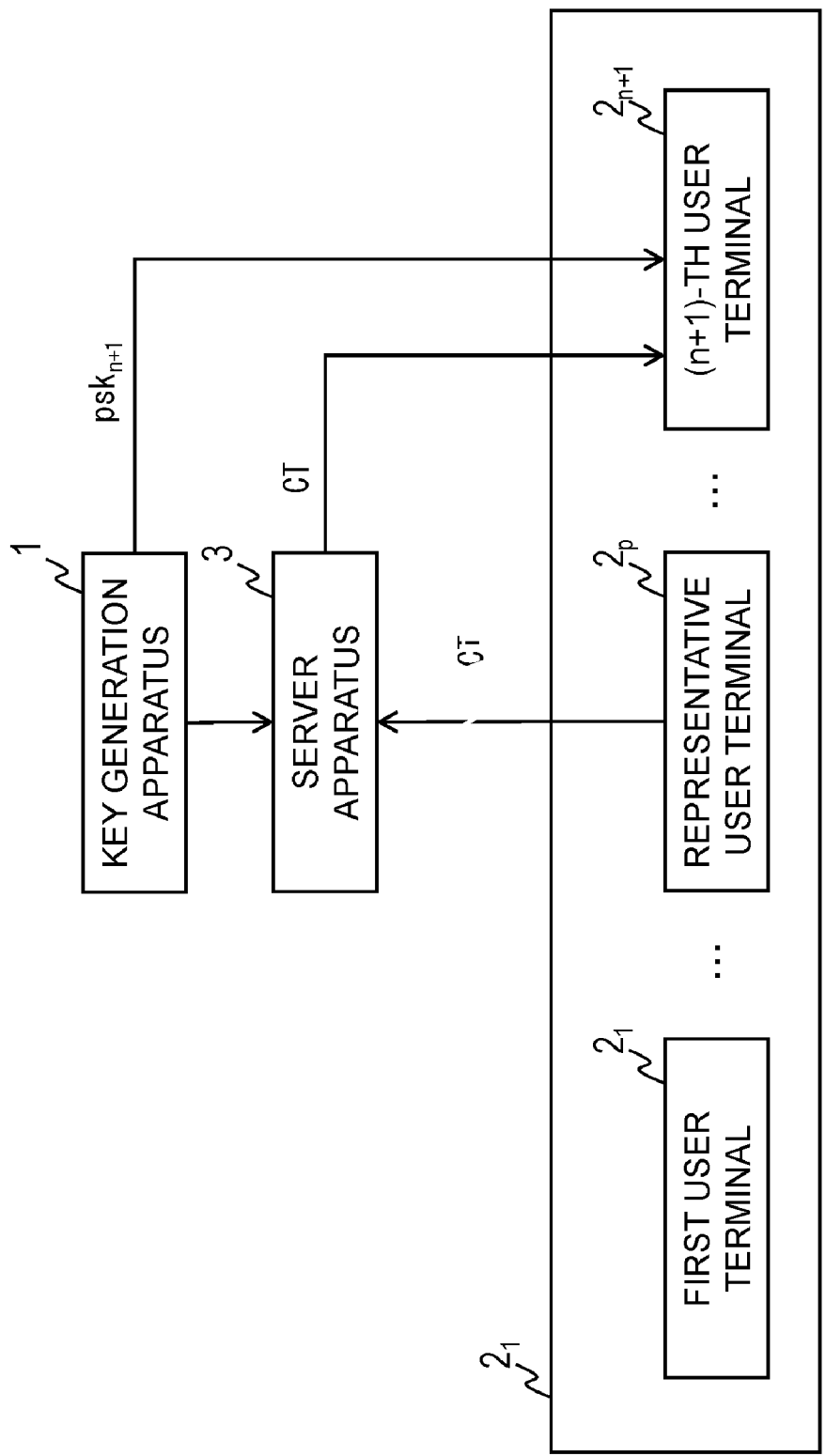
FIG. 1 is a block diagram showing an example key distribution system.

An embodiment of the present invention will be described below by referring to the drawings.

As shown in FIG. 1, a key distribution system includes, for example, a key generation apparatus 1, user terminals 2, and a server apparatus 3.

The user terminals 2 are formed, for example, of the first user terminal $2_1$ to the (n+1)-th user terminal $2_{n+1}$. It is assumed that one of the first user terminal $2_1$ to the n-th user terminal $2_n$ is selected in advance as a representative user terminal $2_p$. It is also assumed that the (n+1)-th user terminal $2_{n+1}$ tries to join the session already joined by the first user terminal $2_1$ to the n-th user terminal $2_n$.

Figure 2:
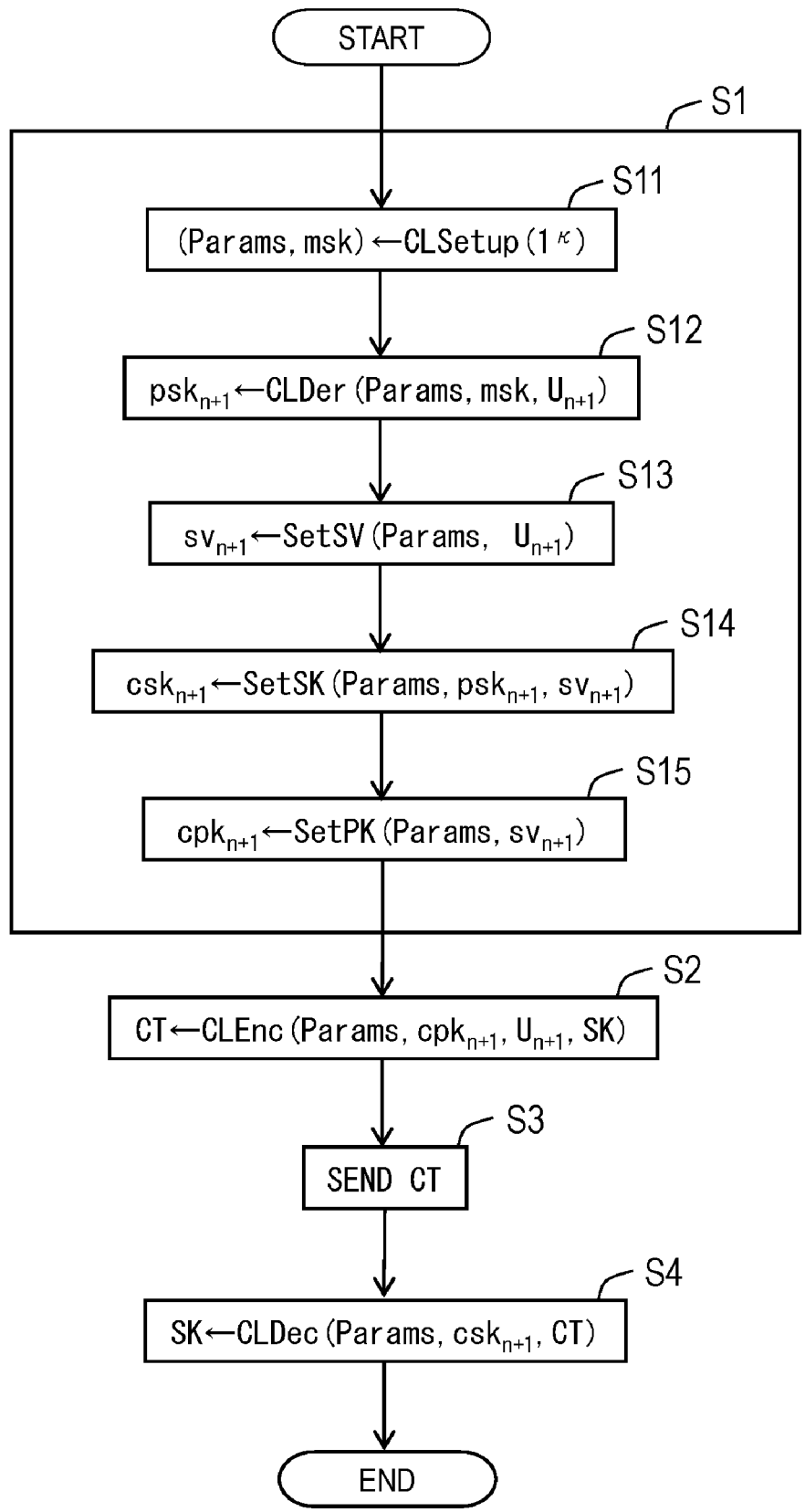
FIG. 2 is a flowchart showing an example key distribution method.

A key distribution method is implemented, for example, when the components of the key distribution system perform processing illustrated in Step S1 to Step S4 shown in FIG. 2 and to be described below.

The processing illustrated in Step S1 is implemented, for example, by the following processing illustrated in Step S11 to Step S15.

First, the key generation apparatus 1 performs the processing (Params, msk)←CLSetup($1^\kappa$) (Step S11). Specifically, the key generation apparatus 1 uses a predetermined setup function CLSetup in Certificate-less Encryption to generate public parameters Params and a master secret key msk. Here, κ is a security parameter.

Then, the key generation apparatus 1 performs processing of $psk_{n+1}$←CLDer(params, msk, $U_{n+1}$) (Step S12). Specifically, the key generation apparatus 1 uses the master secret key msk and information $U_{n+1}$ for identifying the (n+1)-th user terminal $2_{n+1}$ to generate a partial secret key $psk_{n+1}$ for the (n+1)-th user terminal $2_{n+1}$ with a predetermined partial-secret-key generation function CLDer in Certificate-less Encryption, the function being determined by the public parameters Params, and sends the partial secret key to the (n+1)-th user terminal $2_{n+1}$.

The (n+1)-th user terminal $2_{n+1}$ performs the processing $sv_{n+1}$←SetSV(Params, $U_{n+1}$) (Step S13). Specifically, the (n+1)-th user terminal $2_{n+1}$ uses the information $U_{n+1}$ for identifying the (n+1)-th user terminal $2_{n+1}$ to generate secret information $sv_{n+1}$ for the (n+1)-th user terminal $2_{n+1}$ with a predetermined secret-information generation function SetSV in Certificate-less Encryption, the function being determined by the public parameters Params.

The (n+1)-th user terminal $2_{n+1}$ performs the processing $csk_{n+1} \leftarrow SetSK(Params, psk_{n+1}, sv_{n+1})$ (Step S14). Specifically, the (n+1)-th user terminal $2_{n+1}$ uses the partial secret key $psk_{n+1}$ for the (n+1)-th user terminal $2_{n+1}$ and the secret information $sv_{n+1}$ for the (n+1)-th user terminal $2_{n+1}$ to generate a complete secret key $csk_{n+1}$ for the (n+1)-th user terminal $2_{n+1}$ with a predetermined complete-secret-key generation function SetSK in Certificate-less Encryption, the function being determined by the public parameters Params.

The (n+1)-th user terminal $2_{n+1}$ performs the processing $cpk_{n+1} \leftarrow SetPK(Params, sv_{n+1})$ (Step S15). Specifically, the (n+1)-th user terminal $2_{n+1}$ uses the secret information $sv_{n+1}$ for the (n+1)-th user terminal $2_{n+1}$ to generate a public key $cpk_{n+1}$ for the (n+1)-th user terminal $2_{n+1}$ with a predetermined public-key generation function SetPK in Certificate-less Encryption, the function being determined by the public parameters Params, and sends the public key to the representative user terminal $2_p$.

The representative user terminal $2_p$ performs the processing $CT \leftarrow CLEnc(Params, cpk_{n+1}, U_{n+1}, SK)$. Specifically, the representative user terminal $2_p$ uses the public key $cpk_{n+1}$ for the (n+1)-th user terminal $2_{n+1}$ and the information $U_{n+1}$ for identifying the (n+1)-th user terminal $2_{n+1}$ to encrypt key information SK with a predetermined encryption function CLEnc in Certificate-less Encryption, the function being determined by the public parameters Params, to obtain ciphertext CT, and sends the obtained ciphertext CT to the server apparatus 3 (Step S2).

The key information SK is a session key or the like. The key information SK itself may be used as a key. Alternatively, other key information is generated on the basis of the key information SK and the other key information may be used as a key.

The processing of Step S1 and Step S2 is performed for each user terminal which may join the session. When N user terminals may join the session, where N is an integer equal to or more than two, the processing of Step S1 and Step S2 is performed for each of the N user terminals as the (n+1)-th user terminal $2_{n+1}$.

It is assumed that the processing of Step S1 and Step S2 is performed before processing of a so-called join phase formed of Step S3 and Step S4 described below. In Step S3 and Step S4, the (n+1)-th user terminal $2_{n+1}$ is added to the session already joined by the first user terminal $2_1$ to the n-th user terminal $2_n$.

The server apparatus 3 sends the ciphertext CT to the (n+1)-th user terminal $2_{n+1}$ when the (n+1)-th user terminal $2_{n+1}$ is added to the session of a predetermined service (Step S3). The ciphertext Ct is generated in the processing of Step S2 for the (n+1)-th user terminal $2_{n+1}$.

The (n+1)-th user terminal $2_{n+1}$ performs the processing $SK \leftarrow CLDec(Params, csk_{n+1}, CT)$ (Step S4). Specifically, the (n+1)-th user terminal $2_{n+1}$ uses the complete secret key $csk_{n+1}$ for the (n+1)-th user terminal $2_{n+1}$ to decrypt the ciphertext CT with a predetermined decryption function CLDec in Certificate-less Encryption, the function being determined by the public parameters Params, to obtain the key information SK.

As described above, with the use of Certificate-less Encryption, ciphertext related to key information is computed in advance and is stored in the server apparatus 3 beforehand, and the ciphertext is passed in the join phase to the (n+1)-th user terminal $2_{n+1}$ to be added, allowing the key information to be passed to the (n+1)-th user terminal $2_{n+1}$ to be added, without degrading the security level.

In addition, computation is made unnecessary at that time in the join phase between the user terminals that have already joined the session and the server apparatus. Therefore, a quick session participation is possible.

The above-described key distribution system can be used, for example, for (1) key distribution in VoIP calls used in two-point telephone calls and telephone conferencing, (2) key distribution for encrypted communication in web conferencing and web calls performed and made through browsers and smartphones, as a substitute for DLTS in WebRTC, and (3) key distribution for sharing a decryption key in message applications.

Program and Recording Media

When the processing in the key generation apparatus 1, the representative user terminal $2_p$, the (n+1)-th user terminal $2n+1$, and the server apparatus 3 is implemented by a computer, for example, the processing details of the functions possessed by these terminals and apparatuses are written in a program. When the program is executed by the computer, the processing in each terminal and each apparatus is implemented on the computer.

The program containing the processing details can be recorded in a computer-readable recording medium. The computer-readable recording medium can be any type of medium, such as a magnetic recording device, an optical disc, a magneto-optical recording medium, or a semiconductor memory.

The processing in each terminal and each apparatus may be implemented by executing the predetermined program on the computer, but at least a part of the processing may be implemented by hardware.

Modification

In the above-described embodiment, the key generation apparatus 1 and the server apparatus 3 are different from each other. However, the key generation apparatus 1 and the server apparatus 3 may be one apparatus. For example, the server apparatus 3 may include the key generation apparatus 1.

In addition to the modification described above, it is needless to say that appropriate changes can be made within the scope of the present invention.

Security

Security in Certificate-less Encryption can be defined in the following two ways. Definition 1: An attacker can replace the public key but cannot obtain the complete secret key. Definition 2: An attacker can obtain the complete secret key but cannot replace the public key. In definition 2, a key generation center (KGC, corresponding to the key generation apparatus 1 in the above-described embodiment) is a malicious model.

In the above-described embodiment, Certificate-less Encryption is used to pass the key information SK to the (n+1)-th user terminal $2_{n+1}$, a join user, through the server apparatus 3. The server apparatus 3 passes the complete secret key, as a KGC. When it is assumed that the server apparatus 3 is semi-honest, the server apparatus 3 cannot understand any information related to the key information in Certificate-less Encryption due to security in definition 2. From definition 1, an attacker who can replace the public key cannot obtain any information related to the key information.

What is claimed is:

1. A key distribution system comprising:
a key generation apparatus;
a representative user terminal;
a server apparatus; and
an (n+1)-th user terminal;
the key generation apparatus including processing circuitry configured to perform (i) using a predetermined setup function in Certificate-less Encryption to generate public parameters Params and a master secret key, and (ii) using the master secret key and information for identifying the (n+1)-th user terminal to generate a partial secret key for the (n+1)-th user terminal with a predetermined partial-secret-key generation function in Certificate-less Encryption, the partial-secret-key generation function being determined by the public parameters Params, and sending the partial secret key to the (n+1)-th user terminal; the (n+1)-th user terminal (iii) using the information for identifying the (n+1)-th user terminal to generate secret information for the (n+1)-th user terminal with a predetermined secret-information generation function in Certificate-less Encryption, the secret-information generation function being determined by the public parameters Params, (iv) using the partial secret key for the (n+1)-th user terminal and the secret information for the (n+1)-th user terminal to generate a complete secret key for the (n+1)-th user terminal with a predetermined complete-secret-key generation function in Certificate-less Encryption, the complete-secret-key generation function being determined by the public parameters Params, and (v) using the secret information for the (n+1)-th user terminal to generate a public key for the (n+1)-th user terminal with a predetermined public-key generation function in Certificate-less Encryption, the public-key generation function being determined by the public parameters Params, and sending the public key to the representative user terminal;

the representative user terminal including processing circuitry configured to perform using a public key for the (n+1)-th user terminal and information for identifying the (n+1)-th user terminal in Certificate-less Encryption to encrypt key information with a predetermined encryption function in Certificate-less Encryption to obtain ciphertext, and sending the obtained ciphertext to the server apparatus;

the server apparatus including processing circuitry configured to perform sending the ciphertext to the (n+1)-th user terminal when the (n+1)-th user terminal is added to a session of a predetermined service; and the (n+1)-th user terminal including processing circuitry configured to perform using a complete secret key for the (n+1)-th user terminal in Certificate-less Encryption to decrypt the ciphertext with a predetermined decryption function in Certificate-less Encryption to obtain the key information, wherein the key information is a session key, the key distribution system does not require computation between user terminals that have already joined a session and the server apparatus at that time in a join phase in which the key information is distributed to the (n+1)-th user terminal to be newly added.

2. A key distribution method comprising:

a step in which a key generation apparatus (i) uses a predetermined setup function in Certificate-less Encryption to generate public parameters Params and a master secret key, and (ii) uses the master secret key and information for identifying an (n+1)-th user terminal to generate a partial secret key for the (n+1)-th user terminal with a predetermined partial-secret-key generation function in Certificate-less Encryption, the partial-secret-key generation function being determined by the public parameters Params, and sends the partial secret key to the (n+1)-th user terminal;

a step in which the (n+1)-th user terminal (iii) uses the information for identifying the (n+1)-th user terminal to generate secret information for the (n+1)-th user terminal with a predetermined secret-information generation function in Certificate-less Encryption, the secret-information generation function being determined by the public parameters Params, (iv) uses the partial secret key for the (n+1)-th user terminal and the secret information for the (n+1)-th user terminal to generate a complete secret key for the (n+1)-th user terminal with a predetermined complete-secret-key generation function in Certificate-less Encryption, the complete-secret-key generation function being determined by the public parameters Params, and (v) uses the secret information for the (n+1)-th user terminal to generate a public key for the (n+1)-th user terminal with a predetermined public-key generation function in Certificate-less Encryption, the public-key generation function being determined by the public parameters Params, and sends the public key to a representative user terminal;

a step in which a representative user terminal uses a public key for the (n+1)-th user terminal and information for identifying the (n+1)-th user terminal in Certificate-less Encryption to encrypt key information with a predetermined encryption function in Certificate-less Encryption to obtain ciphertext and sends the obtained ciphertext to a server apparatus;

a step in which the server apparatus sends the ciphertext to the (n+1)-th user terminal when the (n+1)-th user terminal is added to a session of a predetermined service; and a step in which the (n+1)-th user terminal uses a complete secret key for the (n+1)-th user terminal in Certificate-less Encryption to decrypt the ciphertext with a predetermined decryption function in Certificate-less Encryption to obtain the key information, wherein the key information is a session key, the key distribution method does not require computation between user terminals that have already joined a session and the server apparatus at that time in a join phase in which the key information is distributed to the (n+1)-th user terminal to be newly added.

* * * * *